(12) United States Patent
Zentz et al.

(10) Patent No.: US 11,709,598 B2
(45) Date of Patent: Jul. 25, 2023

(54) DYNAMIC OVERPROVISIONING OF STORAGE DEVICE

(71) Applicant: EMC IP Holding Company LLC, Hopkinton, MA (US)

(72) Inventors: Dustin H. Zentz, Northborough, MA (US); Kuolin Hua, Natick, MA (US); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 344 days.

(21) Appl. No.: 17/026,650

(22) Filed: Sep. 21, 2020

(65) Prior Publication Data
US 2022/0091753 A1   Mar. 24, 2022

(51) Int. Cl.
G06F 3/06  (2006.01)

(52) U.S. Cl.
CPC ............ G06F 3/0611 (2013.01); G06F 3/064 (2013.01); G06F 3/0608 (2013.01); G06F 3/0616 (2013.01); G06F 3/0673 (2013.01)

(58) Field of Classification Search
CPC .... G06F 3/0611; G06F 3/0608; G06F 3/0616; G06F 3/064; G06F 3/0673; G06F 3/0688; G06F 3/0665
See application file for complete search history.

(56) References Cited

U.S. PATENT DOCUMENTS

| | | | |
|---|---|---|---|
| 6,348,881 B1* | 2/2002 | Buer | H03M 7/3084 375/240 |
| 7,079,051 B2* | 7/2006 | Storer | H03M 7/30 341/51 |
| 10,027,547 B1* | 7/2018 | Weller | G06F 11/1466 |
| 10,642,520 B1* | 5/2020 | Zhao | G06F 3/0644 |
| 2014/0143517 A1* | 5/2014 | Jin | G06F 3/067 711/171 |
| 2014/0181369 A1* | 6/2014 | Horn | G06F 12/0246 711/103 |
| 2017/0285973 A1* | 10/2017 | Dalmatov | G06F 3/0653 |

OTHER PUBLICATIONS

Anonymous, "SSD Over-Provisioning and Its Benefits", Feb. 24, 2015, pp. 1-7, https://web.archive.org/web/20150224011313/https://www.seagate.com/tech-insights/ssd-over-provisioning-benefits-master-ti/ (Year: 2015).*

* cited by examiner

*Primary Examiner* — Christopher D Birkhimer

(57) ABSTRACT

The over-provisioning (OP) of a physical storage device (PSD) may be increased, and the useful life of the PSD increased, by converting uncompressed data stored on the PSD to compressed data. It may be determined that increasing the useful life of the PSD, and the data reduction resulting from the compression, outweigh the benefit of faster I/O response times if the data remains uncompressed. A first portion of the PSD may be initially reserved for compression. A second portion of the PSD may store compressed data. It may be determined whether it is desirable to increase the OP of the PSD to thereby reduce the effective write rate on the PSD. If compression is determined to be desirable, the dynamic portion may be compressed, thereby reducing the amount of storage space consumed by the data, and freeing up storage space that can be used by the PSD for OP.

20 Claims, 7 Drawing Sheets

400

LSU Track Table Header 401

| LSU Track ID 402 | PSD ID 404 | Starting Location 406 | Length 408 | PSD Portion Type 410 | OP state 411 |
|---|---|---|---|---|---|
| 1 | 15 | | | 2 - static | |
| 2 | 3 | | | 1 - dynamic | |
| 3 | 22 | | | 2 - static | |
| 4 | 1 | | | 2 - static | |
| 5 | 19 | | | 2 - static | |
| 6 | 3 | | | | |
| ... | | | | | |
| n | 15 | | | 1 - dynamic | |

{ 412

500

PSD Portion Header 501

| Sub-portion ID. 504 | Sub-portion Address 506 | OP Use 507 | LSU ID 508 | LSU Track ID 510 |
|---|---|---|---|---|
| 1 | | | | |
| 2 | | | | |
| ... | | | | |
| n | | | | |

{ 502

DYNAMIC OVERPROVISIONING OF STORAGE DEVICE

BACKGROUND

Technical Field

This application generally relates to data storage systems, and more particularly to overprovisioning a storage device on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a physical storage device including a first portion designated for dynamically compressed data and a second portion designated for compressed data, wherein data in the first portion is initially uncompressed. The method includes: determining a current write rate for the physical storage device; determining whether to increase over-provisioning for the physical storage device based on the current write rate; and, if it is determined to increase the over-provisioning, compressing data in the first portion, resulting in one or more unused sub-portions of the first portion and use of the one or more unused sub-portions for over-provisioning. Determining whether to increase the over-provisioning may include determining an adjusted write rate that would enable the physical storage device to endure until a predefined endurance date, and determining whether to increase the over-provisioning based at least in part on the adjusted write rate and an estimated decrease in write rate to the physical storage device if the first portion were compressed. The method may further include: for each of a plurality of over-provisioning increases on the first physical storage device, determining a write amplification reduction resulting from the over-provisioning increase, wherein determining whether to increase over-provisioning may include estimating an over-provisioning increase if the first portion is increased, and determining the estimated decrease in write rate based on the estimated over-provisioning increase. The first portion may corresponds to a plurality of tracks of one or more LSUs, and, for each of the plurality of tracks, a data structure for the LSU of the track may include an entry specifying that the track is included in the first data portion designated for dynamically compressed data. For each of the plurality of tracks, the entry in the data structure may specify a location and length of the track within the first portion, and the method further may include, for each of the plurality of tracks, updating the entry in the data structure for the LSU of the track in response to the compression of the data portion to reflect a reduced length of the track. The method may further include determining an endurance increase factor, where determining whether to increase the over-provisioning for the physical storage device is based at least in part on the endurance increase factor. The current write rate may be a first current write rate determined at a first point in time, and the method further may include, after compressing data in the first portion: determining a second current write rate for the physical storage device at a second point in time after the first point in time; determining whether to decrease over-provisioning for the physical storage device based on the current write rate; if it is determined to decrease the over-provisioning, decompressing data in the first portion; and, as a result of the decompression, allocating one or more sub-portions being used for over-provisioning to the first portion.

In another embodiment, a system includes a physical storage device including a first portion designated for dynamically compressed data and a second portion designated for compressed data, wherein data in the first portion is initially uncompressed, and executable logic that implements a method including: determining a current write rate for the physical storage device; determining whether to increase over-provisioning for the physical storage device based on the current write rate; and, if it is determined to increase the over-provisioning, compressing data in the first portion, resulting in one or more unused sub-portions of the first portion and use of the one or more unused sub-portions for over-provisioning. Determining whether to increase the over-provisioning may include determining an adjusted write rate that would enable the physical storage device to endure until a predefined endurance date, and determining whether to increase the over-provisioning based at least in part on the adjusted write rate and an estimated decrease in write rate to the physical storage device if the first portion were compressed. The method further include, for each of a plurality of over-provisioning increases on the first physical storage device, determining a write amplification reduction resulting from the over-provisioning increase, where determining whether to increase over-provisioning may include: estimating an over-provisioning increase if the first portion is increased; and determining the estimated decrease in write rate based on the estimated over-provisioning increase. The first portion may correspond to a plurality of tracks of one or more LSUs, where, for each of the plurality of tracks, a data structure for the LSU of the track may include an entry specifying that the track is included in the first data portion designated for dynamically compressed data. For each of the plurality of tracks, the entry in the data structure may specify a location and length of the track within the first portion, and wherein the method further may include, for each of the plurality of tracks, updating the entry in the data structure for the LSU of the track in response to the compression of the data portion to reflect a reduced length of the track. The method further may include determining an endurance increase factor, where determining whether to increase the over-provisioning for the physical storage device may be based at least in part on the endurance increase factor. The current write rate may be a first current write rate determined at a first point in time, and the method further may include, after compressing data in the first portion: determining a second current write rate for the physical storage device at a second point in time after the first point in time; determining whether to decrease over-provisioning for the physical storage device based on the current write rate; if it is determined to decrease the over-provisioning, decompressing data in the first portion; and, as a result of the decompression, allocating one or more sub-portions being used for over-provisioning to the first portion.

In another embodiment of the invention, for a physical storage device including a first portion designated for dynamically compressed data and a second portion designated for compressed data, wherein data in the first portion is initially uncompressed, computer-readable media having software stored thereon includes: executable code that determines a current write rate for the physical storage device; executable code that determines whether to increase over-provisioning for the physical storage device based on the current write rate; and executable code that, if it is determined to increase the over-provisioning, compresses data in the first portion, resulting in one or more unused sub-portions of the first portion and use of the one or more unused sub-portions for over-provisioning. Determining whether to increase the over-provisioning may include determining an adjusted write rate that would enable the physical storage device to endure until a predefined endurance date, and determining whether to increase the over-provisioning based at least in part on the adjusted write rate and an estimated decrease in write rate to the physical storage device if the first portion were compressed. The software further may include. executable code that, for each of a plurality of over-provisioning increases on the first physical storage device, determines a write amplification reduction resulting from the over-provisioning increase, where determining whether to increase over-provisioning may include: estimating an over-provisioning increase if the first portion is increased; and determining the estimated decrease in write rate based on the estimated over-provisioning increase. The first portion may correspond to a plurality of tracks of one or more LSUs, where, for each of the plurality of tracks, a data structure for the LSU of the track may include an entry specifying that the track is included in the first data portion designated for dynamically compressed data. The software further may include executable code that determines an endurance increase factor, where determining whether to increase the over-provisioning for the physical storage device is based at least in part on the endurance increase factor. The current write rate may be a first current write rate determined at a first point in time, and the software further may include, executable code that, after compressing data in the first portion: determines a second current write rate for the physical storage device at a second point in time after the first point in time; determines whether to decrease over-provisioning for the physical storage device based on the current write rate; if it is determined to decrease the over-provisioning, decompresses data in the first portion; and, as a result of the decompression, allocates one or more sub-portions being used for over-provisioning to the first portion.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
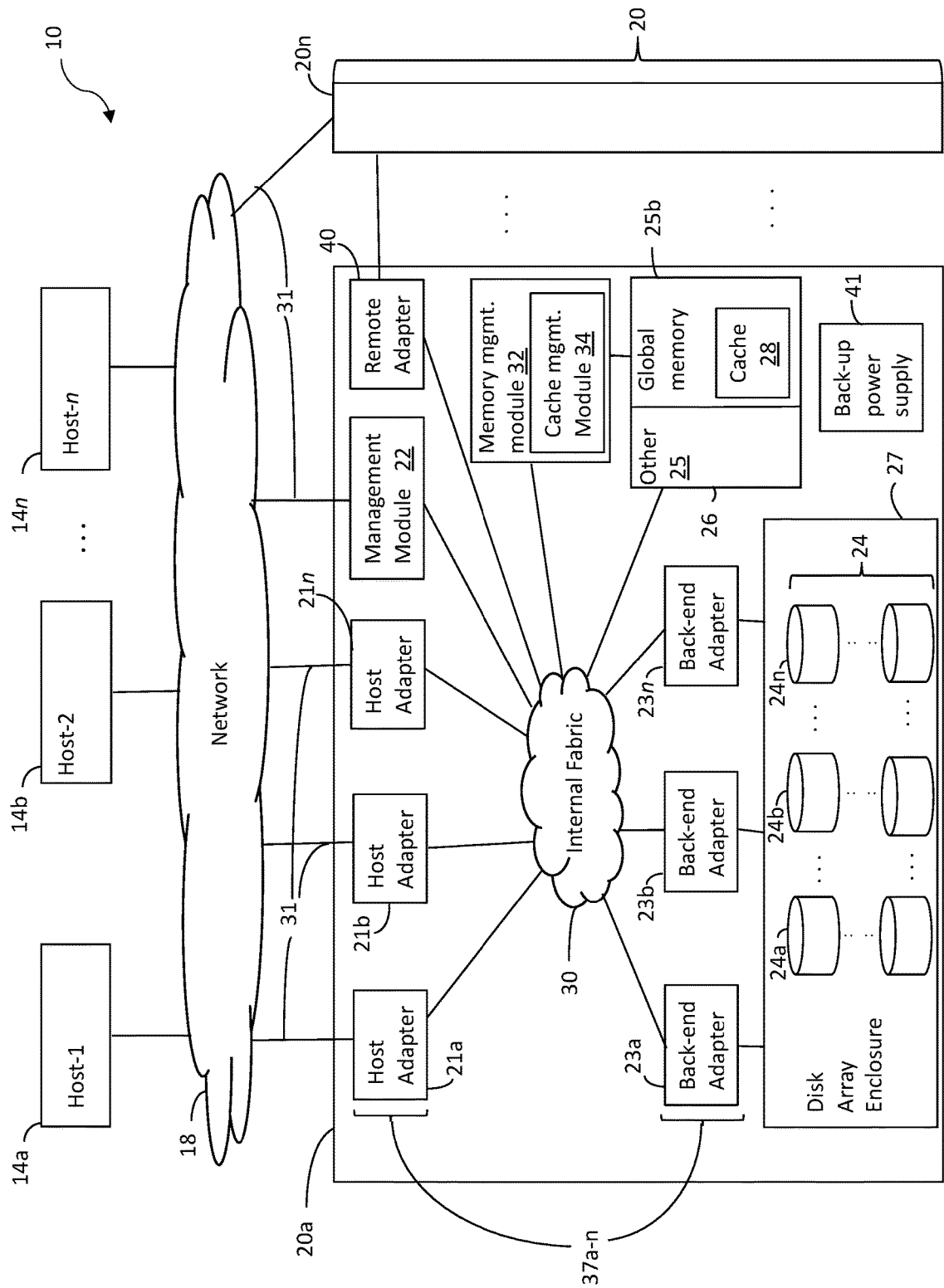
FIG. 1 is a block diagram illustrating an example of a data storage network, according to embodiments of the invention.

There a several types of PSDs, including solid state devices (SSDs), for example, flash and other NAND-based media. The DWPD (Device Writes Per Day) rating ("WPD") for an SSD represents the average daily amount of data that can be written to the SSD, relative to the storage capacity of the SSD, such that a useful life of the SSD will be the specified duration warranty period. For example, if an SSD has a 1 TB capacity, a WPD=1 and a specified warranty duration of 2 years, then the SSD will be considered to have reached the end of its useful life at two years from the start of its use if the average volume of writes per day over the two-year span is 1 TB per day. If the average volume of writes per day is greater than 1 TB, then the useful life of the SSD will be considered shorter than the warranty period of 2 years, and if the average volume of writes per day is less than 1 TB, then the useful life of the SSD will be considered longer than 2 years.

The WPD of an SSD is dependent on (among other factors) the percentage of SSD capacity space reserved for performing I/O processing tasks on the SDD, as opposed to storing data written to the PSD. A capacity space on an SSD may be considered reserved if it is not available to be allocated to store data for the storage system, e.g., for applications running on the storage system or application running on host systems that use the storage system to store data. The amount or percentage of storage capacity so reserved may be referred to herein as an amount or percentage of over-provisioning (OP). For example, a typical SSD may reserve approximately 7% of its total capacity for OP.

Reserved OP space may be used to perform background tasks, for example, garbage collection and wear leveling. The reserved OP space also may be used to move, write and/or re-write data and metadata in performance of a write operation, where such data manipulation is performed as part of a well-known, undesirable phenomenon of SSDs known as write amplification (WA). WA results in the actual amount of information physically written to media on the SSD being greater than the logical amount intended to be written to the SSD, e.g., written to the SSD from a director of a storage system. For example, data may be written to the SSD from a director configured to serve as a back-end adapter of the storage system that interfaces to SSDs, where such a director may be referred to herein as a BE (back-end adapter). WA may be expressed as a factor referred to herein as a write amplification factor (WAF). For example, a WAF=2 means that, for X amount of data written to the disk over time, the actual amount of physical media space written-to on the SSD as a result of WA is 2×; WAF=3.2 means an actual amount of 3.2× is written; WAF=5.1 means 5.1× is written, etc. A WAF=1 means in effect that there is no WA.

Increasing the reserved OP on an SSD reduces the WAF such that, for a same amount of data written to the SSD, a less physical media space of the SSD is actually written as a result of WA. Thus, increasing the reserved OP on an SSD can increase the useful lifetime of the SSD; i.e., increase the endurance of the SSD. An SSD should be replaced at the end of its useful lifetime, which has a certain cost. Further, the replacement of the SSD, including moving the data therefrom, consumes system resources, and may impact system performance. Increasing reserved OP on an SSD may delay the replacement cost of an SSD, thereby reducing the overall replacement costs of SSDs on a storage system over time, and may reduce consumption of storage system resources over time, which may reduce occurrences of performance degradation.

Thus, it may be desirable to increase OP on SSDs on a storage system, to extend the useful lifetimes of the SSDs, thereby reducing SSD replacement costs on the storage system; and to reduce consumption of storage system resources over time, which may reduce occurrences of performance degradation.

On some storage systems, data is compressed when stored on PSDs (e.g., SSDs) to reduce an amount of data stored. On some such storage systems, certain data may not be compressed for faster I/O processing, as the data does not need to be compressed when written to the PSD or decompressed when read from the PSD. For example, it may be desirable to not compress some or all "hot" data—i.e., data that is accessed very frequently. The threshold of access frequency above which data is not compressed may be based on many factors, and may represent a threshold above which the benefits of access speed outweigh the benefits of data reduction.

In some embodiments of the invention, the OP of a PSD may be increased, and the useful life of the PSD increased, by converting uncompressed data stored on the PSD to compressed data, i.e., by compressing uncompressed data. In such embodiments, it may be determined that increasing the useful life of the PSD, and the data reduction resulting from the compression, outweigh the benefit of faster I/O response times if the data remains uncompressed.

In some embodiments, a first portion (e.g., 10%) of the PSD may be initially reserved for compression, for example, for sufficiently hot data. The remainder of the PSD storage capacity (that is not reserved OP)—a second portion of the PSD—may store compressed data. The first portion may be referred to herein as a "dynamic portion" as it may be compressed and decompressed dynamically as described in more detail herein. The second portion may be referred to herein as a "static portion" as it may not be compressed and decompressed dynamically, but rather remain compressed.

It may be determined whether it is desirable to increase the OP of the PSD to thereby reduce the effective (i.e., amplified) write rate on the PSD. The effective write rate is the amount (i.e., volume) of writing that actually occurs on the PSD as a result of WA, as opposed to the write rate for the PSD perceived by the storage system; e.g., by a BE of the storage system. It should be appreciated that, for a same perceived write rate, the effective write rate may be greater based on the WAF of the PSD. For example, an average perceived write rate over the life of the PSD to date, referred to as the current write rate (CWR), may be determined, for example, by a BE or other functional component of the storage system. If the CWR is determined to be greater than the WPD of the PSD, this means that the useful life of the PSD will be shorter than it would be if the CWR=WPD. In response to this determination, an adjusted write rate (AWR) may be determined, which is an average perceived write rate for the PSD that would add a specified additional amount of time onto the current determined useful life of the PSD to produce a target useful life (TUL). The TUL may be a default useful life (DUL) of the PSD, or may be longer (or even shorter if so desired). It also may be determined how much free space will be created if the first portion of the PSD is compressed, which space can be used for reserved OP and thus may be referred to herein as "increased reserved OP" or simply "increased OP."

A reduction in WAF, referred to herein as an write amplification factor reduction or write amplification reduction (WAR), may be estimated from the increased OP based on previous measurements. The determination of whether to compress the first portion to increase reserved OP and thereby extend the useful life of the PSD may be based on the estimated WAR, the AWR, the WPD, and perhaps other factors. If compression is determined to be desirable, the dynamic portion may be compressed, thereby reducing the amount of storage space consumed by the data, and freeing up storage space that can be used by the PSD for OP.

As should be understood from further description herein, the AWR is a hypothetical value used to determine whether to compress data of the dynamic portion of the PSD. The average perceived write rate of the SSD is never actually changed, but rather the average effective write rate of the WPD may be changed. The WPD reflects a perceived average amount of writing per day (from beginning use of the PSD) that would result in the DUL of the PSD, and it is assumed to factor the effective write rate resulting from the WA of the PSD. Further, the CWR reflects a perceived average write rate of the PSD up until a certain date, which has a corresponding effective write rate based on the same WA. Thus, as the CWR and the WPD are expressions of perceived write rate, not of effective write rate, the AWR may be determined and expressed in terms of a perceived write rate for the purposes of determining whether to compress the dynamic portion of the PSD to increase OP, thereby reducing the WAF and extending the useful life of the PSD, even though the perceived write rate of the PSD may not be changed.

In some embodiments, after the dynamic portion of the PSD is compressed to increase the OP of the PSD, it may be determined at a later time to decompress the data of the first portion, for example, if it is determined that the CWR is less than the WPD, or less than the WPD by a predefined amount. Decompressing data of the first portion decreases reserved OP on the PSD and decrease its useful life. It should be appreciated that a threshold write rate used to determine whether to compress the dynamic portion of the PSD may be different than a threshold write rate used to determine whether to decompress the dynamic portion.

In some embodiments of the invention, data structures may be maintained that map logical tracks (or other logical storage elements) of an LSU to PSDs and locations thereon, which specify whether the PSD location is part of a dynamic portion of the PSD that is not initially compressed, but may be dynamically compressed to increase reserved OP, or whether the PSD location is part of a static portion of the PSD that is compressed and not subject to such dynamic compression. Entries in such data structures also may specific a length of a logical track, which may be adjusted when the data of the logical track is compressed or decompressed. One or more other data structures may be provided that map PSD locations (e.g., blocks) to LSU tracks, which may be used to determine the LSU tracks corresponding to PSD blocks, for example, PSD blocks within a first portion of the PSD that are dynamically compressed and decompressed according to embodiments described herein.

It should be appreciated that, while embodiments of the invention are described in relation to a PSD having only a single dynamic portion, in some embodiments a PSD may have multiple dynamic portions, where each such portion may be compressed and/or decompressed at the same or different times as other dynamic portions according to techniques described herein.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more 10 requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24*a*-*n* of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20*a*, a single BE, such as 23*a*, may be responsible for the management of one or more (e.g., a row) of physical storage devices, such as row 24*a*. That is, in some configurations, all IO communications with one or more physical storage devices 24 may be controlled by a specific BE. BEs 23*a*-*n* may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20*a* also may include one or more host adapters ("HAs") 21*a*-*n*, which also are referred to herein as front-end adapters ("FAs") (e.g., directors configured to serve as FAs). Each of these FAs may be used to manage communications and data operations between one or more host systems and global memory (GM) 25*b* of memory 26. The FA may be, or include, a Fibre Channel (FC) adapter if FC is a technology being used to communicate between the storage system 20*a* and the one or more host systems 14*a*-*n*, or may be another type of adapter based on the one or more technologies being used for IO communications.

Also shown in the storage system 20*a* is a remote adapter ("RA") 40. The RA may be, or include, hardware that includes a processor used to facilitate communication between storage systems (e.g., 20*a* and 20*n*), such as between two of the same or different types of storage systems, and/or may be implemented using a director.

Storage system 20*a* also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20*a*, for example, as part of one of host systems 14*a*-*n* or another separate system connected to storage system 20*a* via network 18.

The FAs, BEs and RA may be collectively referred to herein as directors 37*a*-*n*. Each director 37*a*-*n* may be implemented (e.g., in hardware, firmware, software or a combination thereof) on a circuit board that includes memory resources (e.g., at least a segment of GM portion 25*b*) and compute resources, for example, one or more processing cores (e.g., as part of a CPU) and/or a CPU complex for processing IO operations, and that as described in more detail elsewhere herein. There may be any number of directors 37*a*-*n*, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20*a* also may include an internal switching fabric (i.e., internal fabric) 30, which may include one or more switches, that enables internal communications between components of the storage system 20*a*, for example, directors 37*a*-*n* (FAs 21*a*-*n*, BEs 23*a*-*n*, RA 40, management module 22) and memory 26, e.g., to perform IO operations. One or more internal logical communication paths may exist between the directors and the memory 26, for example, over the internal fabric 30. For example, any of the directors 37*a*-*n* may use the internal fabric 30 to communicate with other directors to access any of physical storage devices 24; i.e., without having to use memory 26. In addition, one of the directors 37*a*-*n* may be able to broadcast a message to all of the other directors 37*a*-*n* over the internal fabric 30 at the same time. Each of the components of system 20*a* may be configured to communicate over internal fabric 30 in accordance with one or more technologies such as, for example, InfiniBand (TB), Ethernet, Gen-Z, another technology, or any suitable combination of the foregoing.

The GM portion 25*b* may be used to facilitate data transfers and other communications between the directors 37*a*-*n* in a storage system. In one embodiment, the directors 37*a*-*n* (e.g., serving as FAs or BEs) may perform data operations using a cache 28 that may be included in the GM 25*b*, for example, in communications with other directors, and other components of the system 20*a*. The other portion 25*a* is that portion of memory that may be used in connection with other designations that may vary in accordance with each embodiment. Global memory 25*b* and cache 28 are described in more detail elsewhere herein. It should be appreciated that, although memory 26 is illustrated in FIG. 1 as being a single, discrete component of storage system 20*a*, the invention is not so limited. In some embodiments, memory 26, or the GM 25*b* or other memory 25*a* thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14*a*-*n*) may be notified that the write operation has completed. At a later time, the write data may be de-staged from cache 28 to one or more physical storage devices 24*a*-*n*, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
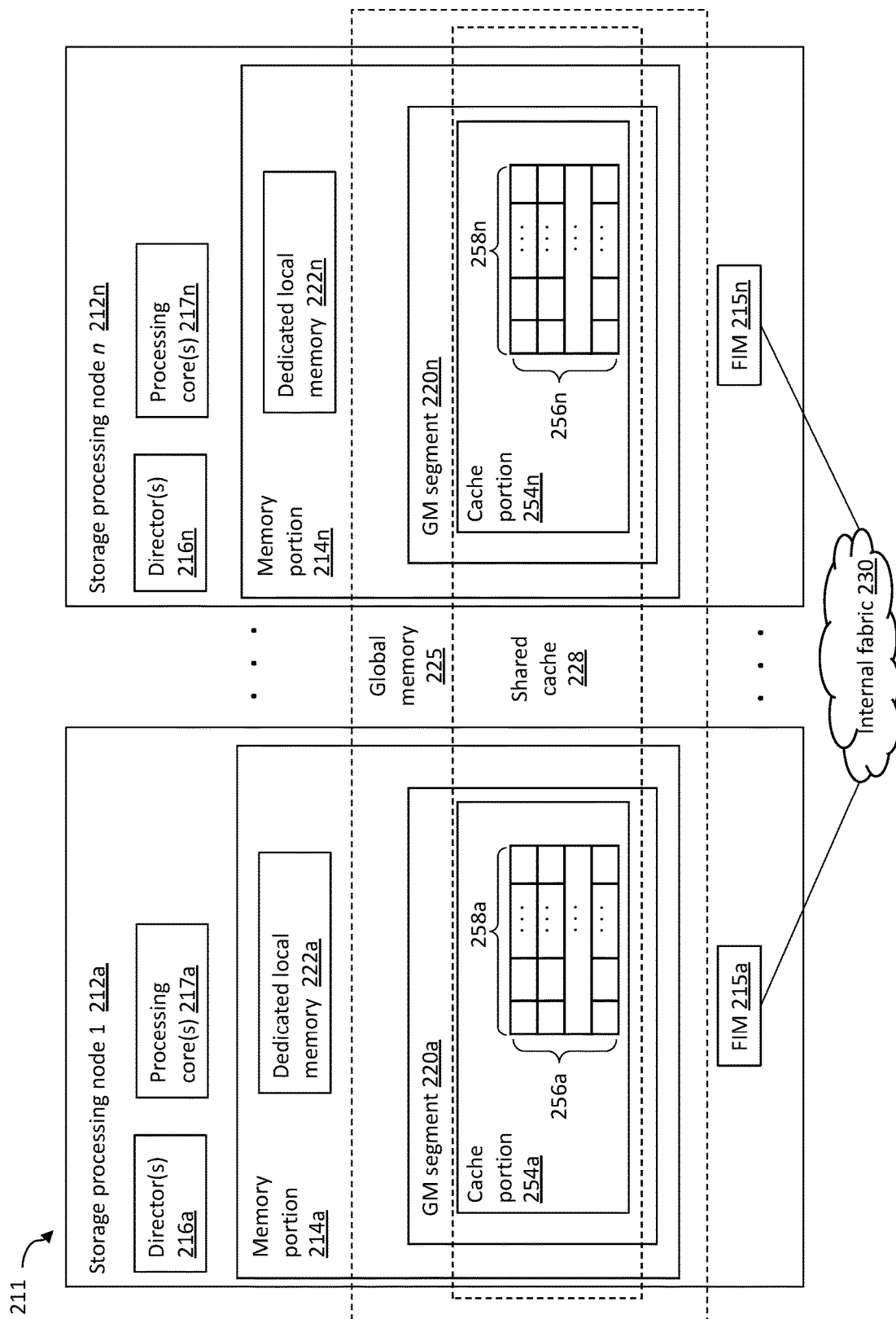
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
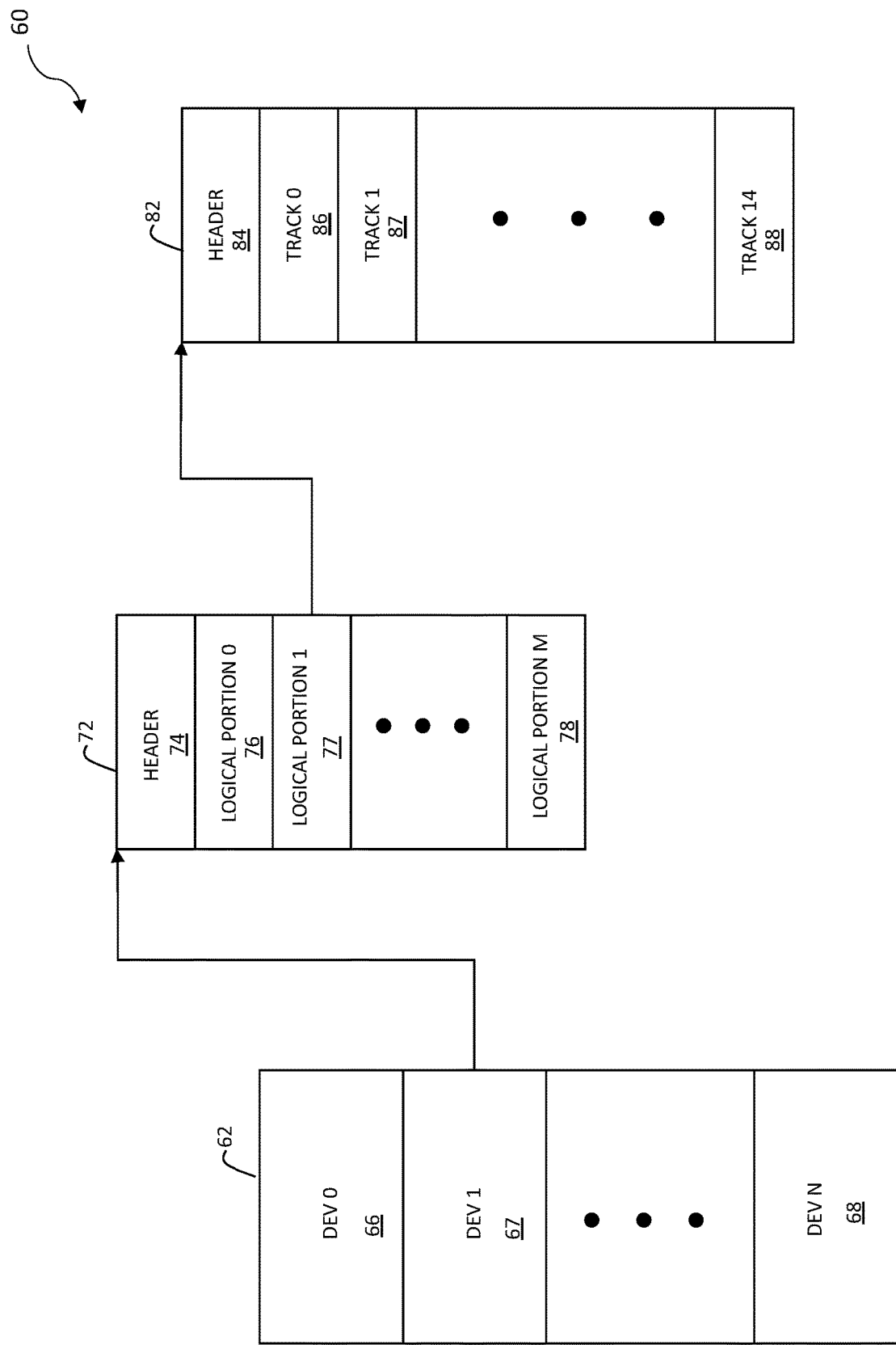
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

Figures 3B, 4, 5:
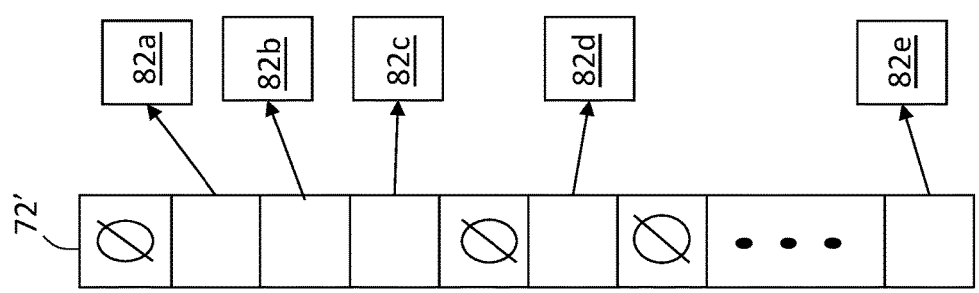
FIG. 3B a block diagram illustrating an example of a table used for a thin logical device, according to embodiments of the invention.
FIG. 4 illustrates an example of a logical storage unit track table, according to embodiments of the invention.
FIG. 5 illustrates an example of a PSD dynamic portion table, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

The tables 62, 72, 72' and 82 may be stored in the GM 26 of the storage system 20a during operation thereof and may otherwise be stored in non-volatile memory (e.g., within a corresponding PSD). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', and 82. Other data structures may be stored in any of GM 25b, memory 25a, GM segment 220a-n and/or dedicated local memories 22a-n.

FIG. 4 illustrates an example of an LSU track table 400, according to embodiments of the invention. Other embodiments of a data structure for maintaining LSU track information, for example, variations of the table 400, are possible and are intended to fall within the scope of the invention. The LSU track table 400 may be a variation of the LSU track table 82, and may be stored in the GM 26 of the storage system 20a during operation thereof and may otherwise be stored in non-volatile memory (e.g., within a corresponding PSD).

The LSU track table 400 may include a header 401 and a plurality of entries 412, each entry representing an LSU track as defined elsewhere herein. The header 401 may include information pertaining to the LSU that is not specific to any one or more LSU tracks, for example, an ID of the LSU and a pointer or other reference to a logical portion of a LSU table 72 to which it belongs. Each entry may specify any of: a LSU track ID in LSU track ID column 404; a PSD ID in PSD ID column 404; a starting location (e.g., logical block address (LBA)) of the physical location of the data of the LSU track within a PSD portion in starting location column 406; a length of data of the LSU track to be consumed within the PSD portion (e.g., number of blocks) in length column 408; a value indicating a PSD portion type in PSD portion type column 410; an value indicating an increased-OP state of the PSD (and PSD portion) in OP state column 411; and other information.

The value in PSD portion type column 410 may specify a value indicating whether the PSD portion is a dynamic portion or a static portion of the PSD. For example, a value=1 may represent a dynamic portion of the PSD and value=2 may represent a static portion of the PSD. In some embodiments in which NVMe technology is employed, the PSD portion type may be expressed in terms of an NVMe namespace ID, for example, namespace1=a dynamic portion of the PSD, and namespace2=a static portion. If the PSD portion corresponding to an LSU track is a dynamic portion, e.g., as specified in column 410, the value in the OP state column 411 may indicate whether or not the PSD, and thus the dynamic portion, is in an increased-OP state (described in more detail elsewhere herein).

FIG. 5 illustrates an example of a PSD portion table 500, according to embodiments of the invention. Other embodiments of a data structure for maintaining PSD portion information, for example, variations of the table 500, are possible and are intended to fall within the scope of the invention. The PSD portion table 500 may include a header 501 and a plurality of entries 502, each entry representing a sub-portion (e.g., block) of a portion of a PSD as defined elsewhere herein. The portion may be a dynamic portion, a static portion or another type of portion. Embodiments in which the portion is a dynamic portion are described in more detail herein, but the invention is not so limited, as such embodiments and other embodiments may apply to static portions and other types of portions as well. The header 502 may include: information identifying the PSD; an address range within the PSD of the dynamic portion represented by the portion table 501; a dynamic portion ID; information indicating whether or not the dynamic portion currently is in an increased-OP state (described in more detail elsewhere herein); and other information pertaining to the dynamic portion that is not specific to any one or more sub-portions. Each entry may specify any of: a sub-portion (e.g., block) ID in sub-portion ID column 504; a sub-portion address (e.g., LBA) in sub-portion address column 506; an indication of whether the sub-portion is currently available for OP (as opposed to being allocated to store data for an LSU track); an LSU ID of the LSU to which the sub-portion maps (if any) in LSU ID column 508; an LSU track ID of the LSU track (if any) to which the sub-portion maps in LSU track ID column 510; and other information.

It should be appreciated that initially no data will be stored within any sub-portions of the dynamic portion (or any portion) on the PSD, such that initially each entry 502 may have a value in the column 507 indicating that the sub-portion is currently available for OP. That is, while such sub-portions may not be reserved for OP exclusively, such sub-portion may be used for over-provisioning until they are allocated fort data of an LSU track. As data for LSU tracks are written to the dynamic portion of the PSD, sub-portions of the dynamic portion will start being allocated and used; and, for each such sub-portion, the value in the OP Use column 507 of the entry 502 for the sub-portion may be changed to indicate that the sub-portion is not currently available for OP. Further, if the dynamic portion is compressed, the value in the column 507 for the sub-portions of the dynamic portion freed-up by the compression may be changed to indicate that the sub-portion is currently available for OP.

Figure 6:
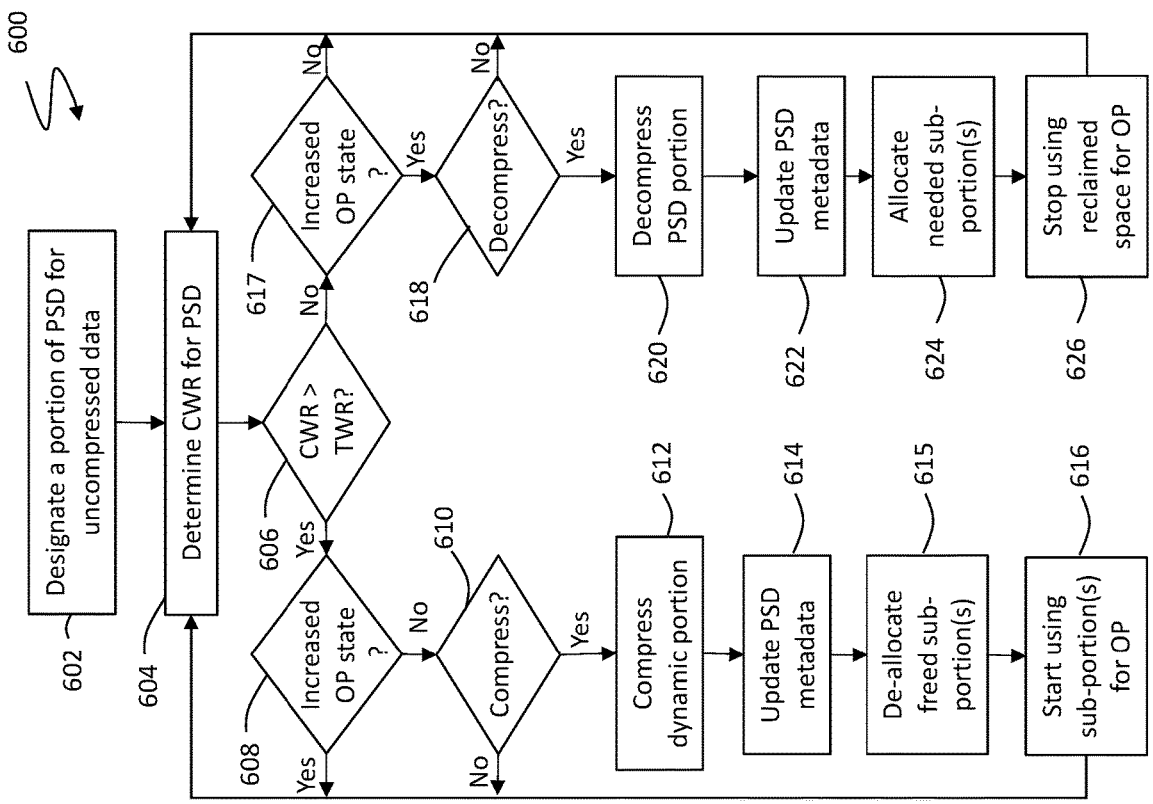
FIG. 6 is a flowchart illustrating an example of a method of dynamically overprovisioning a physical storage device, according to embodiments of the invention.

FIG. 6 is a flowchart illustrating an example of a method 600 of dynamically overprovisioning a PSD, according to embodiments of the invention. Other embodiments of a method of dynamically overprovisioning a PSD, for example, variations of the method 600, are possible and are intended to fall within the scope of the invention.

In a step 602, a first portion of the PSD may be designated for uncompressed data—i.e., may be designated as the dynamic portion of the PSD. For example, a BE or other functional component of the storage system may be configured to enable a user to specify a designated portion of PSD to be the dynamic portion.

In a step 604, a CWR for the PSD may be determined. For example, a database of historical IO activity for the PSD may be accessed on the storage system. Such database may include any of a variety of historical IO activity information pertaining to the PSD, including information concerning write operations on the PSD such as, for example: the number or writes to the PSD per one or more periods of time (e.g., day(s), week(s), month(s), years(s), since PSD has been in use, other); the volume of data (e.g., number of bytes) written to the PSD over one or more periods of time; one or more averages of the number of writes and/or volume of data written to the PSD per a sub-period of a longer period of time (e.g., average volume of writes per day since use of PSD started, CWR); other information; and any suitable combination of the foregoing. The step 604 may include obtaining the value of the CWR of the PSD from such a database or deriving it from other data in the database.

In a step 605, it may be determined whether the CWR of the PSD is greater than a threshold write rate (TWR), for example, the WPD of the PSD. It should be appreciated that a TWR other than the WPD of the PSD may be used. For example, in some embodiments, it may be desirable to extend the useful life of the PSD beyond the DUL of the PSD, in which case a TWR less than the WPD may be used, to potentially cause the dynamic portion to be compressed earlier.

If it is determined in the step 606 that the CWR is not greater than the TWR, then the method 600 may end. In some embodiments, if the test performed in the step 606 is negative, the step 606 may be repeated, for example, at a predefined later point in time. For example, the storage system (or other entity on behalf of the storage system) may perform the steps 606-626 at scheduled times (e.g., periodically) or in response to an event (e.g., user input).

If it is determined in the step 606 that the CWR is greater than the TWR, then in a step 608 it may be determined whether the PSD is already in an increased-OP state. An increased-OP state is a state in which the dynamic portion of the PSD has already been compressed to increase reserved OP, for example, based on a prior performance of steps 610-616. Determining whether the PSD is in an increased-OP state may include accessing the header 501 of the PSD portion table 501 for a dynamic portion of the PSD.

If it is determined in a step 608 that the PSD is already in an increased-OP state, then method 600 may end or return to the step 604 (e.g., at a later point in time according to a schedule or in response to an event). For example, the storage system (or other entity on behalf of the storage system) may perform the steps 606-626 at scheduled times (e.g., periodically) or in response to an event (e.g., user input). In another embodiment, if the OP is in an increased-OP state, rather than ending or returning to the step 604, the method may include determining whether to decrease reserved OP, as described in more detail elsewhere herein. For example, even though CWR>TWR, the perceived write rate to the PSD may have declined to such an extent and/or the effect of the increased-OP state may be so much greater than estimated that the TUL is now estimated to be longer than desired (e.g., vs. the performance improvement if the dynamic portion is decompressed) such that is it is desired to shorten the useful current estimated useful life.

If it is determined in a step 608 that the PSD is not in an increased-OP state, then in a step 610 it may be determined whether to compress the dynamic portion of the PSD, for example, as described in more detail elsewhere herein. If it is determined in the step 610 not to compress the dynamic portion of the PSD, then method 600 may end or return to the step 604 (e.g., at a later point in time according to a schedule or in response to an event).

If it is determined in a step 610 to compress the dynamic portion, then in a step 612 the dynamic portion may be compressed. Compressing the dynamic portion may include compressing LSU tracks on one or more LSUs. For example, in response to a determination to compress the dynamic portion, the sub-portions (e.g., blocks) included in the dynamic portion may be determined, and the corresponding LSU tracks may be determined from the PSD portion table 500. The data of these one or more LSU tracks then many be compressed, which may result in a decrease in the length of one or more LSU tracks. This metadata and other metadata pertaining to the PSD may be updated in the LSU track table 400 and PSD sub-portion table 500 with changes resulting from the compression. For example, the header 501 of the PSD portion table 501 for the dynamic portion may be updated to reflect that the dynamic portion is in the increased-OP state. Further, for each LSU track corresponding to at least a sub-portion of the dynamic portion, a value in the OP state column 411 of an entry 412 corresponding to the LSU track may be updated to reflect that the dynamic portion is in the increased-OP state.

As a result of the compression of the dynamic portion of the PSD, one or more sub-portions (e.g., blocks) of the dynamic portion may no longer be needed to store a compressed portion of data, such that these sub-portions may be freed-up for other uses. For example, these sub-portions may correspond to the freed-up parts (e.g., logical blocks) of LSU tracks no longer needed by the LSU track due to its smaller compressed size. To this end, the BE or another functional component of the storage system may de-allocate these freed-up sub-portions in a step 615, for example, by sending to the PSD an un-map command specifying the freed-up sub-portions. The PSD may be configured to delete the data in the de-allocated sub-portions and use the de-allocated space for reserved OP in a step 616. Thus, by compressing the dynamic portion of the PSD, the reserved OP of the PSD may be increased. For each sub-portion of the dynamic portion freed-up as a result of the compression, updating the metadata of the PSD in the step 614 may include updating the OP Use field 507 of the entry 502 representing the sub-portion to reflect that the sub-portion is now available for use for OP.

While the dynamic portion is in the increased-OP state, the freed-up sub-portions of the PSD may be reserved for OP use in the sense that they are only used for OP tasks (e.g., including processing tasks associated with WA), and not for storing data. This reserved use may be enforced by the BE or other functional component processing IO operations (e.g., write operations) on the storage system, by maintaining fixed-size LSU track boundaries for any LSU tracks corresponding to a dynamic portion of a PSD. Whether an LSU track corresponds to a dynamic portion of the PSD may be determined from the value specified in the PSD portion column 410 of the entry 412 for the LSU track in the LSU track table 400. It should be appreciated that, for an LSU track, the sub-blocks of the PSD used to store the data of the LSU track and the freed-up sub-blocks reserved for OP may remain unchanged during the increased-OP state as long as the data of the LSU track is not changed. The data of an LSU track may change for any of a variety of reasons, for example: by a modification or deletion of the data of one or more corresponding LSU blocks; by a change in the status of the data portion from being hot enough to be designated to the dynamic portion; or by another operation on the storage system (e.g., migration, re-provisioning, failure and recovery, new data services, etc.). However, the sub-blocks used for data and the sub-blocks reserved for OP during the increased-OP state may change as a result of the occurrence of any of the foregoing.

If it is determined in the step 606 that the CWR is not greater than the TWR, then it may be determined in the step 617 whether the PSD is in an increased-OP state. If it is determined in the step 617 that the PSD is not in an increased-OP state, then method 600 may end or return to the step 604 (e.g., at a later point in time according to a schedule or in response to an event).

If it is determined in the step 617 that the PSD is in an increased-OP state, then in a step 618 it may be determined whether to decompress the dynamic portion of the PSD, thereby decreasing an amount of reserved OP on the PSD. If it is determined in the step 618 not to decompress the dynamic portion of the PSD, then method 600 may end or return to the step 604 (e.g., at a later point in time according to a schedule or in response to an event).

If it is determined in a step 618 to decompress the dynamic portion, then in a step 620 the dynamic portion may be decompressed. Decompressing the dynamic portion may include decompressing LSU tracks on one or more LSUs. For example, in response to a determination to decompress the dynamic portion, the sub-portions (e.g., blocks) included in the dynamic portion may be determined. For the sub-portions not being used for reserved OP, but rather to store data, the LSU tracks corresponding to the sub-portions may be determined from the PSD portion table 500. The data of these one or more LSU tracks then many be decompressed, which may result in an increase in the length of one or more LSU tracks. This metadata and other metadata pertaining to the PSD then may be updated with changes resulting from the decompression in the LSU track table 400 and PSD sub-portion table 500. For example, the header 501 of the PSD portion table 501 for the dynamic portion may be updated to reflect that the dynamic portion is not in the increased-OP state. Further, for each LSU track corresponding to at least a sub-portion of the dynamic portion, a value in the OP state column 411 of an entry 412 corresponding to the LSU track may be updated to reflect that the dynamic portion is not in the increased-OP state.

As a result of the decompression of the dynamic portion of the PSD, one or more additional sub-portions (e.g., blocks) of the PSD may be needed to store the now decompressed data. To this end, the BE or another functional component of the storage system may allocate sub-portions from the PSD in a step 615, for example, by sending to the PSD a map command specifying the needed sub-portions, in response to which the PSD may stop using such sub-portions for OP. For each sub-portion of the dynamic portion re-claimed by an LSU track as a result of the decompression, updating the metadata of the PSD in the step 622 may include updating the OP Use field 507 of the entry 502 representing the sub-portion to reflect that the sub-portion is no longer available for use OP—i.e., that the sub-portion is no longer reserved OP.

It should be appreciated that while a PSD, and more specifically a dynamic portion of a PSD, is in an increased-OP state, the sub-blocks of the dynamic portion used for data and the sub-blocks used for OP may change for any of a variety of reasons described in more detail elsewhere herein. Accordingly, the LSU tracks corresponding to sub-portions of the dynamic portion may be different at the time of decompression than when the dynamic portion was previously compressed.

Figure 7:
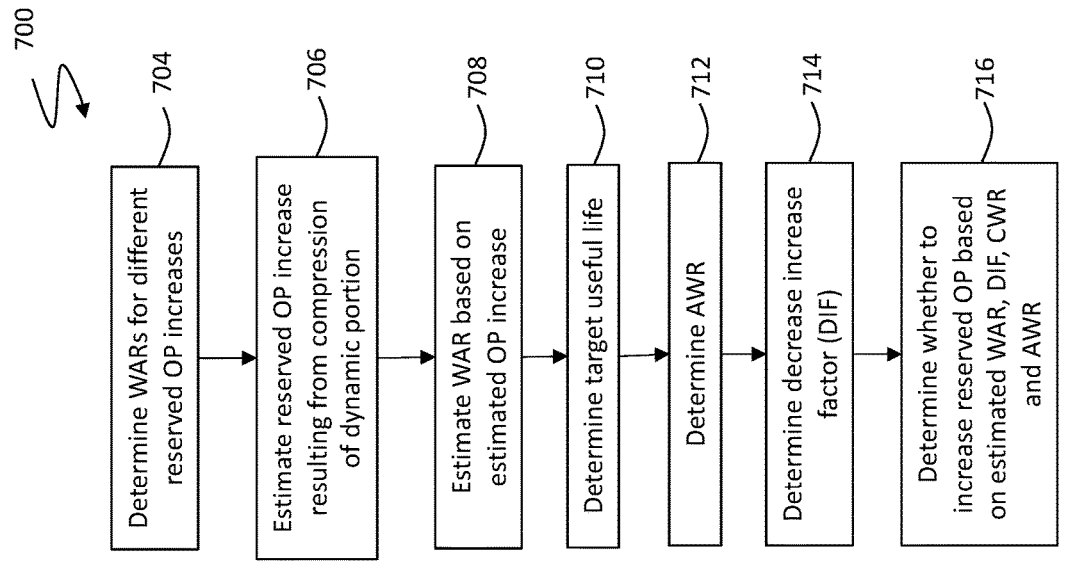
FIG. 7 is a flowchart illustrating an example of a method of determining whether to compress a portion of a physical storage device to increase an amount of overprovisioning, according to embodiments of the invention.

FIG. 7 is a flowchart illustrating an example of a method 700 of determining whether to compress a portion of a physical storage device to increase an amount of overprovisioning, according to embodiments of the invention. Other embodiments of a method of determining whether to compress a portion of a physical storage device to increase an amount of overprovisioning, for example, variations of the method 700, are possible and are intended to fall within the scope of the invention.

In a step 704, different WARs for different reserved OP increases may be determined for the PSD, for example, by experimentation. For example, the WAF for different amounts of reserved OP on the PSD may be measured and recorded. A first WAF measured may be the default WAF for the default reserved OP of the PSD. For example, the default reserved OP of an SSD may be the amount reserved by the SSD vendor and not made available to consumers (e.g., customers) of the SSD. Often this default reserve amount of storage capacity (i.e., the default reserved OP) is a function of differences in the manner in which SSD storage capacity is marketed and expressed and the manner in which memory capacity is generally expressed. The default OP may be about 7% of the actual storage capacity of an SSD. After the default WAF for the default reserved OP of the PSD is measured, the WAF for other amounts of reserved OP for the SSD may be measured. For example, the reserved OP amounts of the PSD may be configured to be progressively greater, and the WAF associated with each OP amount measured. For each default OP amount, the WAF may be measured by writing an amount of data (e.g., twice the storage capacity of the PSD) to the PSD over a period of time. During this time, the WAF of the PSD may be measured and recorded. From these measured and recorded WAFs, the WAR from the default WAF may be measured. This and other information may be recorded in a data structure, for example, WAR table 800 described in relation to FIG. 8. It should be appreciated that the step 704 should be performed before the PSD is put into live use.

Figure 8:
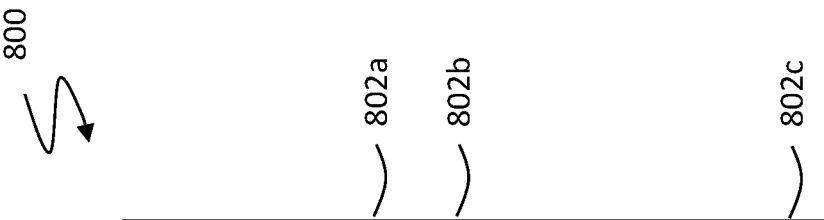
FIG. 8 illustrates an example of a write amplification reduction table, according to embodiments of the invention.

FIG. 8 illustrates an example of a WAR table 800 for a PSD, according to embodiments of the invention. Other embodiments of a data structures for recording WAR information, for example, variations of table 800, are possible and are intended to fall within the scope of the invention. It should be appreciated that the values provided in the table 800 are provided for illustrative purposes, and may vary between PSDs.

The WAR table 800 includes a plurality of entries 802, each entry representing a different amount of reserved OP. Each entry may specify the following values: an amount (e.g., percentage or ratio) of PSD storage allocated to store data as perceived by the storage system corresponding to the amount of reserved OP represented by the entry in perceived allocation column 804; an actual amount (e.g., percentage or ratio) of PSD storage allocated to store data corresponding to the amount of reserved OP represented by the entry in actual allocation column 804; the amount (e.g., percentage or ratio) of PSD storage reserved for OP represented by the entry in reserved OP column 808; the WAF corresponding to the amount of reserved OP represented by the entry in WAF column 810; the WAR relative to the default WAF of the PSD corresponding to the amount of reserved OP represented by the entry in WAR column 812.

As described in more detail herein, the PSD vendor may configure the PSD with a default reserved OP that is not made available to the user; e.g., the PSD remains hidden from the remainder of the storage system. Accordingly, when a storage system component (e.g., a BE) perceives that 100% of the storage capacity is allocated to store data (e.g., allocated to LSUs of the storage system), while it may be accurate that 100% of the available storage capacity is allocated, only 93% of the actual storage capacity may be allocated, where 7% of capacity is reserve OP. For example, an entry 802a may represent a default amount of OP for the PSD, in which the perceived allocation of storage capacity is 100%, the actual allocation of storage capacity is 93%, and the reserved OP is 7%. It should be appreciated that the reserved OP=100—the actual allocation for all entries; i.e., whatever storage is not allocated is reserved OP. The entry 802a illustrates that, for the default reserved OP of 7%, the default WAF for the PSD is 7.2.

An entry 802b represents a reserved OP of 17%, corresponding to a perceived allocation of 90% and an actual allocation of 83%. The entry 802b illustrates that, for a reserved OP of 17% for the PSD, the WAF is 4.87, which amounts to a WAR of 32.34%. Thus, the entry 802b illustrates that, for the PSD in question, by reducing the perceived allocation (e.g., via user interface provided by a BE or other functional component of the storage system) by 10%, the WAF can reduced by 32.34%. Reducing the perceived allocation may be achieved by compressing a dynamic portion of the PSD such that 10% of the capacity of the PSD is freed-up as a result of the compression.

As another example, an entry 802c represents a reserved OP of 82%, corresponding to a perceived allocation of 25% and an actual allocation of 18%. The entry 802c illustrates that, for a reserved OP of 82% for the PSD, the WAF is 1.05, which amounts to a WAR of 85.45%. Thus, for the PSD in question, with a reserved OP of 82%, there is almost no WA, as the WAF approaches a value of 1.

Returning to the method 700, in a step 706, an increase in the reserved OP that would result by compressing the dynamic portion at the current time may be estimated. For example, a compression ratio and resulting data reduction that would result from compressing the data currently stored in the dynamic portion may be based estimated based on empirical data and/or statistical information. From the estimated data reduction, the amount of freed-up sub-portions of the dynamic portion that may be used as reserved OP (i.e., the increased reserved OP) may be estimated.

In a step 708, the WAR for the PSD resulting from compressing the dynamic portion may be estimated based on the estimated IP increase. For example, the increase in the amount of reserved OP estimated in the step 706 may be added to the current reserved OP to produce an estimated increased reserved OP amount. An entry in the WAR table 800 corresponding to the estimated increased reserved OP amount may be accessed to determine the estimated WAR. For example, if the estimated increased reserved OP amount is 17%, the entry 802b may be accessed to determine an estimated WAR of 32.34%. In some embodiments, if there is no entry 802 representing the exact amount of the estimated increased reserved OP, then the entry representing the closest reserved OP (e.g., within a predefined acceptable range) may be selected. If no reserved OP value represented by any of the entries is within an acceptable predefined range of the estimated increased reserved OP amount, then the estimated WAR may be derived (e.g., interpolated or extrapolated) from WARs of two or more entries of the WAR table 800.

In a step 710, a target useful life (TUL) may be determined (e.g., a value may be set). For example, the TUL may be the DUL or another value, for example, a useful life longer than the DUL or even shorter than the DUL if so desired. A BE or other functional component of the storage system may be configured to provide a user interface to enable a user to specify the TUL.

In a step 712, an AWR for the PSD may be determined, where the AWR is an average perceived write rate for the PSD that would be necessary to achieve the TUL for the PSD based on the CWR, i.e., the average perceived write rate for the PSD to date. For example, in some embodiments, AWR may be derived from the following Equation 1:

$$(m/T) \cdot W + (n/T) \cdot W' = D \qquad \text{Equation 1}$$

where T=TUL, D=WPD, W=CWR, W'=AWR, m=days elapsed since beginning of use of PSD, n=days left until TUL=T−m. Solving Equation 1 for W' produces the following Equation 2 for determining AWR:

$$W' = (1/n) \cdot (T \cdot D - m \cdot W) \qquad \text{Equation 2}$$

In a step 714, a dynamic increase factor (DIF) may be determined (e.g., a value may be set). As is described in more detail elsewhere herein, the DIF may be applied when determining whether to increase reserved OP (e.g., by compressing the dynamic portion) and thus extend the useful life of the PSD. In some embodiments, the DIF has a value greater than 1 (i.e., DIF>1), and the lesser the value of 1, the longer before the reserved OP will be increased (e.g., by compression of the dynamic portion), assuming all factors remain the same. The value of the DIF may be set (e.g., by a storage administrator) at any time before performance of a step 716, e.g., before, after or concurrently to performance of any of steps 704-712. The DIF may be changed over time, for example, between performances of the step 716, e.g., by user input.

In a step 716, it may be determined whether to increase reserved OP based on the estimated WAR, DIF, CWR and AWR. For example, it may be determined when the condition defined by Equation 3 is met:

$$W' \leq (1-\alpha) \cdot \varphi \cdot W \quad \text{Equation 3:}$$

where $\alpha$=WAR and $\varphi$=DIF. As can be seen from Equation 3, the greater the value of the DIF, the less likely Equation 3 will return true and reserved OP will be increased.

Figure 9:
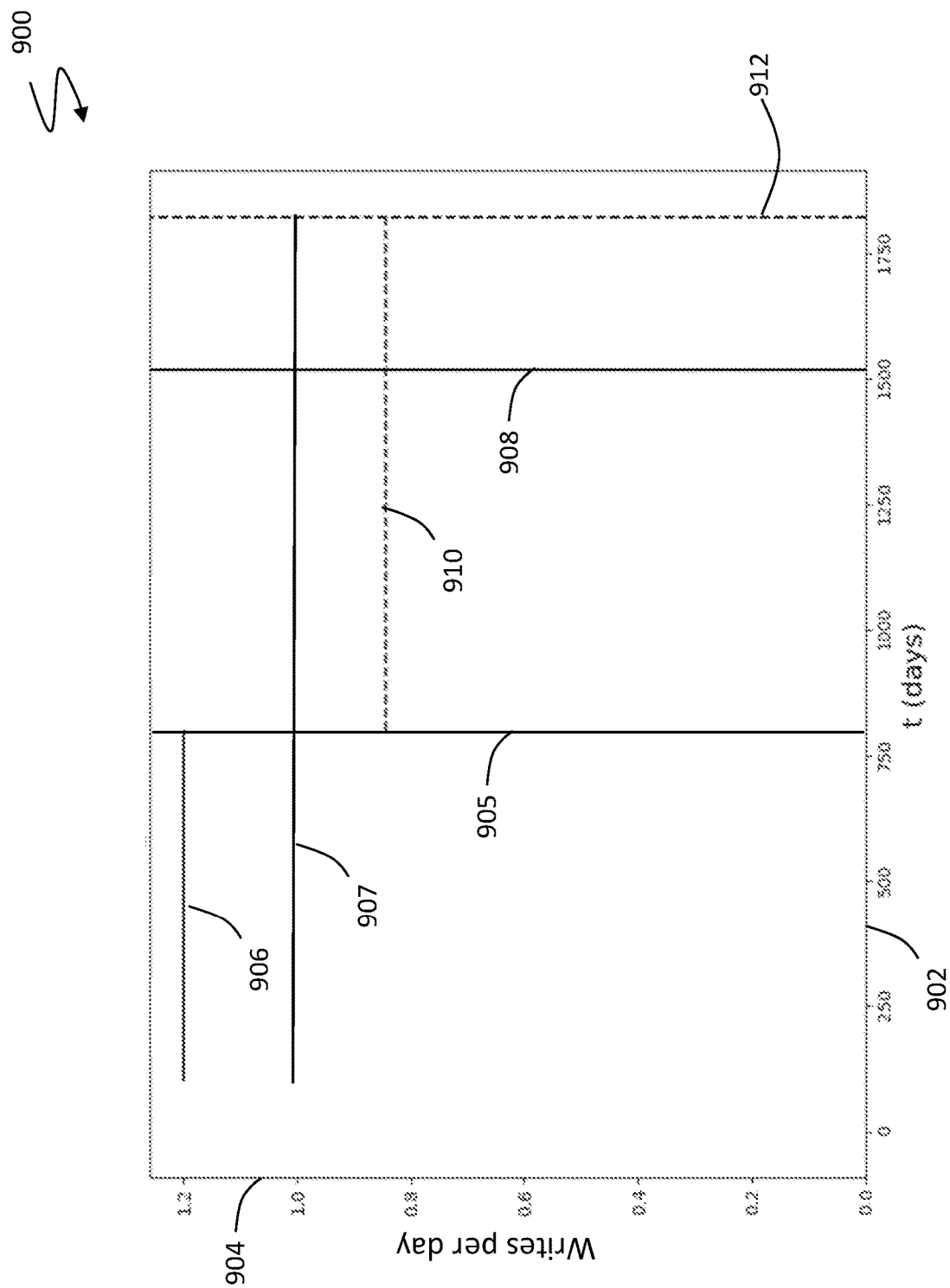
FIG. 9 is a graph illustrating an example of dynamic overprovisioning, according to embodiments of the invention.

An example of dynamic provisioning will now be described with reference to FIG. 9. FIG. 9 is a graph illustrating an example of dynamic overprovisioning, according to embodiments of the invention. The horizontal axis 902 represents time in units of days, and the vertical axis 904 represents the average write volume per day in units of WPD; i.e., WPD=1.0 means a volume of writes per day equal to the storage capacity of the PSD. As described in more detail herein, the WPD is the average write rate that if achieved over a lifetime of the PSD would result in the DUL of the PSD. A line 907 represents the TWR (e.g., set by a user)=WPD=1.0. A line 905 represents the elapsed number of days since the PSD started being used=800 days (e.g., m in Equations 1 and 2). A line 906 represents the determined CWR (e.g., W in Equations 1-3)=1.2 during the elapsed number of days since the PSD started being used. A line 908 represents the projected useful life of the PSD (1521 days) if the CWR continues to be 1.2. A line 912 represents the desired TUL=1825 (5 years), which may be the DUL of the PSD. Thus, at day 800, m=800 and n=1025 in Equations 1 and 2. A line 910 represents the determined AWR (W' in Equations 1-3), starting at day 800, based on CWR=1.2, that is required to add 304 days of useful life to current projected useful life to achieve the TUL of 1825 days. For example, by application of Equation 2, AWR=(1/1025)(1825*1−825*1.2)=(1825−990)/1025=0.815(WPD).

Thus, if it determined to increase the reserved OP of the PSD at day 800 of the life of the PSD (e.g., by application of Equation 3), which may depend on the DIF and the estimated RAW from compressing the dynamic portion of the PSD, the dynamic portion of the PSD may be compressed. Assuming the average perceived write rate to the PSD remains unchanged over the useful life of the PSD, by compressing the dynamic portion at day 800, the useful life of the PSD is estimated to be extended 304 days to the TUL of 1825 days.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 600 and 700, or parts thereof, may be implemented using one or more of the systems and/or data structures described in relation to FIGS. 1-5 and 8 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
   determining, at a first point in time, a current write rate for a physical storage device including a first portion designated for dynamically compressed data and a second portion designated for compressed data, wherein data in the first portion is initially uncompressed;
   determining to increase over-provisioning for the physical storage device based at least in part on the current write rate over a current lifetime of the physical storage device up to the first point in time; and
   responsive to said determining to increase the over-provisioning, compressing data in the first portion designated for dynamically compressed data, wherein said compressing data in the first portion responsive to said determining to increase over-provisioning based at least in part on the current write rate results in one or more unused sub-portions of the first portion and use of the one or more unused sub-portions for over-provisioning.

2. The method of claim 1, wherein said determining to increase the over-provisioning includes:
  determining an adjusted write rate that would enable the physical storage device to endure until a predefined endurance date; and
  determining whether to increase the over-provisioning based at least in part on the adjusted write rate and an estimated decrease in write rate to the physical storage device if the first portion were compressed.

3. The method of claim 2, further comprising:
  for each of a plurality of over-provisioning increases on the physical storage device, determining a write amplification reduction resulting from said each over-provisioning increase,
  wherein said determining whether to increase the over-provisioning includes:
    estimating an over-provisioning increase if the first portion is increased; and
    determining the estimated decrease in write rate based on the estimated over-provisioning increase.

4. The method of claim 1, wherein the first portion corresponds to a plurality of tracks of one or more LSUs (logical storage units), wherein, for each of the plurality of tracks of one of the LSUs, a data structure for said one LSU includes an entry specifying that said each track is included in the first data portion designated for dynamically compressed data.

5. The method of claim 4, wherein, for each of the plurality of tracks, a corresponding entry in the data structure specifies a location and length of the said each track within the first portion, and wherein the method further comprises:
  for each of the plurality of tracks, updating the corresponding entry in the data structure for said each LSU of said each track in response to the compression of the data portion to reflect a reduced length of said each track.

6. The method of claim 1, further comprising:
  determining an endurance increase factor,
  wherein said determining whether to increase the over-provisioning for the physical storage device is based at least in part on the endurance increase factor.

7. The method of claim 1, wherein the current write rate is a first current write rate determined at the first point in time, and wherein the method further comprises, after said compressing data in the first portion:
  determining a second current write rate for the physical storage device at a second point in time after the first point in time;
  determining whether to decrease over-provisioning for the physical storage device based on the second current write rate;
  if it is determined to decrease the over-provisioning, decompressing data in the first portion; and
  as a result of said decompressing, allocating one or more sub-portions being used for over-provisioning to the first portion.

8. A system comprising:
  a physical storage device including a first portion designated for dynamically compressed data and a second portion designated for compressed data, wherein data in the first portion is initially uncompressed;
  executable logic that implements a method including:
    determining, at a first point in time, a current write rate for the physical storage device;
    determining to increase over-provisioning for the physical storage device based at least in part on the current write rate over a current lifetime of the physical storage device up to the first point in time; and
    responsive to said determining to increase the over-provisioning, compressing data in the first portion designated for dynamically compressed data, wherein said compressing data in the first portion responsive to said determining to increase over-provisioning based at least in part on the current write rate results in one or more unused sub-portions of the first portion and use of the one or more unused sub-portions for over-provisioning.

9. The system of claim 8, wherein said determining to increase the over-provisioning includes:
  determining an adjusted write rate that would enable the physical storage device to endure until a predefined endurance date; and
  determining whether to increase the over-provisioning based at least in part on the adjusted write rate and an estimated decrease in write rate to the physical storage device if the first portion were compressed.

10. The system of claim 9, wherein the method further includes:
  for each of a plurality of over-provisioning increases on the first physical storage device, determining a write amplification reduction resulting from said each over-provisioning increase,
  wherein said determining whether to increase the over-provisioning includes:
    estimating an over-provisioning increase if the first portion is increased; and
    determining the estimated decrease in write rate based on the estimated over-provisioning increase.

11. The system of claim 8, wherein the first portion corresponds to a plurality of tracks of one or more LSUs (logical storage units), wherein, for each of the plurality of tracks of one of the LSUs, a data structure for said one LSU includes an entry specifying that said each track is included in the first data portion designated for dynamically compressed data.

12. The system of claim 11, wherein, for each of the plurality of tracks, a corresponding entry in the data structure specifies a location and length of said each track within the first portion, and wherein the method further comprises:
  for each of the plurality of tracks, updating the corresponding entry in the data structure for said each LSU of said each track in response to the compression of the data portion to reflect a reduced length of said each track.

13. The system of claim 8, wherein the method further includes:
  determining an endurance increase factor,
  wherein said determining whether to increase the over-provisioning for the physical storage device is based at least in part on the endurance increase factor.

14. The system of claim 8, wherein the current write rate is the first current write rate determined at a first point in time, and wherein the method further includes, after said compressing data in the first portion:
  determining a second current write rate for the physical storage device at a second point in time after the first point in time;

determining whether to decrease over-provisioning for the physical storage device based on the second current write rate;

if it is determined to decrease the over-provisioning, decompressing data in the first portion; and as a result of said decompressing, allocating one or more sub-portions being used for over-provisioning to the first portion.

15. For a physical storage device including a first portion designated for dynamically compressed data and a second portion designated for compressed data, wherein data in the first portion is initially uncompressed, non-transitory computer-readable media having software stored thereon that, when executed, performs a method comprising:

determining, at a first point in time, a current write rate for the physical storage device;

determining to increase over-provisioning for the physical storage device based at least in part on the current write rate over a current lifetime of the physical storage device up to the first point in time; and responsive to said determining to increase the over-provisioning, compressing data in the first portion designated for dynamically compressed data, wherein said compressing data in the first portion responsive to said determining to increase over-provisioning based at least in part on the current write rate results in one or more unused sub-portions of the first portion and use of the one or more unused sub-portions for over-provisioning.

16. The non-transitory computer-readable media of claim 15, wherein said determining to increase the over-provisioning includes:

determining an adjusted write rate that would enable the physical storage device to endure until a predefined endurance date; and determining whether to increase the over-provisioning based at least in part on the adjusted write rate and an estimated decrease in write rate to the physical storage device if the first portion were compressed.

17. The non-transitory computer-readable media of claim 16, wherein the method further comprises:

for each of a plurality of over-provisioning increases on the first physical storage device, determining a write amplification reduction resulting from said each over-provisioning increase, wherein said determining whether to increase the over-provisioning includes:

estimating an over-provisioning increase if the first portion is increased; and determining the estimated decrease in write rate based on the estimated over-provisioning increase.

18. The non-transitory computer-readable media of claim 15, wherein the first portion corresponds to a plurality of tracks of one or more LSUs, wherein, for each of the plurality of tracks of one of the LSUs, a data structure for said one LSU includes an entry specifying that track said each track is included in the first data portion designated for dynamically compressed data.

19. The non-transitory computer-readable media of claim 15, wherein the method further comprises:

determining an endurance increase factor, wherein said determining whether to increase the over-provisioning for the physical storage device is based at least in part on the endurance increase factor.

20. The non-transitory computer-readable media of claim 15, wherein the current write rate is a first current write rate determined at the first point in time, and wherein the method further comprises, after compressing data in the first portion:

determining a second current write rate for the physical storage device at a second point in time after the first point in time;

determining whether to decrease over-provisioning for the physical storage device based on the second current write rate;

if it is determined to decrease the over-provisioning, decompressing data in the first portion; and as a result of said decompressing, allocating one or more sub-portions being used for over-provisioning to the first portion.

\* \* \* \* \*

UNITED STATES PATENT AND TRADEMARK OFFICE
CERTIFICATE OF CORRECTION

| | |
|---|---|
| PATENT NO. | : 11,709,598 B2 |
| APPLICATION NO. | : 17/026650 |
| DATED | : July 25, 2023 |
| INVENTOR(S) | : Zentz et al. |

It is certified that error appears in the above-identified patent and that said Letters Patent is hereby corrected as shown below:

In the Claims

Column 25, Line 34 In Claim 5, the phrase "length of the said each track" should read -- length of said each track --

Signed and Sealed this
Fifth Day of September, 2023

Katherine Kelly Vidal
*Director of the United States Patent and Trademark Office*